United States Patent
Jung

(10) Patent No.: US 10,840,847 B2
(45) Date of Patent: Nov. 17, 2020

(54) METHOD OF CONTROLLING ELECTRIC OIL PUMP

(71) Applicants: Hyundai Motor Company, Seoul (KR); Kia Motors Corp., Seoul (KR)

(72) Inventor: Byung Hwan Jung, Gwangmyeong-si (KR)

(73) Assignees: Hyundai Motor Company, Seoul (KR); Kia Motors Corp, Seoul (KR)

( * ) Notice: Subject to any disclaimer, the term of this patent is extended or adjusted under 35 U.S.C. 154(b) by 253 days.

(21) Appl. No.: 16/121,858

(22) Filed: Sep. 5, 2018

(65) Prior Publication Data

US 2019/0190430 A1 Jun. 20, 2019

(30) Foreign Application Priority Data

Dec. 19, 2017 (KR) ........................ 10-2017-0174861

(51) Int. Cl.
| | |
|---|---|
| H02P 27/08 | (2006.01) |
| H02P 21/22 | (2016.01) |
| H02P 21/18 | (2016.01) |
| H02P 21/20 | (2016.01) |
| F16N 13/20 | (2006.01) |
| F01M 1/02 | (2006.01) |
| F01M 1/18 | (2006.01) |

(52) U.S. Cl.
CPC ............ *H02P 27/085* (2013.01); *F01M 1/02* (2013.01); *F01M 1/18* (2013.01); *F16N 13/20* (2013.01); *H02P 21/18* (2016.02); *H02P 21/20* (2016.02); *H02P 21/22* (2016.02); *F01M 2001/0215* (2013.01); *F01M 2001/0238* (2013.01); *H02P 2205/01* (2013.01); *H02P 2205/07* (2013.01); *H02P 2209/09* (2013.01)

(58) Field of Classification Search
CPC . F24F 11/52; F24F 11/56; F24F 11/30; G06B 2219/2642; Y02T 10/7005
See application file for complete search history.

(56) References Cited

U.S. PATENT DOCUMENTS

| | | | | |
|---|---|---|---|---|
| 6,424,107 | B1 * | 7/2002 | Lu | H02P 6/10 318/432 |
| 10,220,830 | B2 * | 3/2019 | Colavincenzo | B60W 10/02 |
| 2003/0097837 | A1 * | 5/2003 | Hiraki | E02F 9/2282 60/486 |
| 2004/0187820 | A1 * | 9/2004 | Kondo | F01L 1/34 123/90.17 |
| 2006/0127520 | A1 * | 6/2006 | Lu | B29C 45/82 425/146 |
| 2008/0148858 | A1 * | 6/2008 | Kasik | G01H 1/06 73/649 |
| 2010/0262322 | A1 * | 10/2010 | Yokouchi | B60K 6/26 701/22 |

(Continued)

FOREIGN PATENT DOCUMENTS

KR 2013-0048334 A 5/2013

*Primary Examiner* — Zoheb S Imtiaz
(74) *Attorney, Agent, or Firm* — Morgan, Lewis & Bockius LLP

(57) ABSTRACT

A method of controlling an electric oil pump driven by a motor, may include changing, by a controller, a frequency of a current applied to the motor with a predetermined control cycle to control RPM of the motor to instantaneously change into a different value according to a frequency change.

4 Claims, 4 Drawing Sheets

(56) References Cited

U.S. PATENT DOCUMENTS

| | | | |
|---|---|---|---|
| 2011/0103974 A1* | 5/2011 | Lamascus | F04B 49/065 417/45 |
| 2011/0206537 A1* | 8/2011 | Simpson | E02F 9/207 417/1 |
| 2013/0199865 A1* | 8/2013 | Park | B62D 5/065 180/422 |
| 2013/0213026 A1* | 8/2013 | Yamamoto | F04B 49/002 60/327 |
| 2014/0197638 A1* | 7/2014 | Kusunoki | H02P 9/007 290/43 |
| 2014/0219825 A1* | 8/2014 | Santos | E21B 43/121 417/53 |
| 2015/0130316 A1* | 5/2015 | Caine | H02K 16/005 310/115 |
| 2016/0181964 A1* | 6/2016 | Nojima | F04D 25/0686 318/503 |
| 2017/0088126 A1* | 3/2017 | Prina | H02P 6/08 |
| 2018/0375452 A1* | 12/2018 | Yoshida | F03B 13/06 |

\* cited by examiner

METHOD OF CONTROLLING ELECTRIC OIL PUMP

CROSS REFERENCE TO RELATED APPLICATION

The present application claims priority to Korean Patent Application No. 10-2017-0174861, filed Dec. 19, 2017, the entire contents of which is incorporated herein for all purposes by this reference.

BACKGROUND OF THE INVENTION

Field of the Invention

The present invention relates generally to a method of controlling an electric oil pump reducing noise generated from the oil pump through current control of a motor.

Description of Related Art

Intervals of vanes used in variable oil pumps, etc. are irregular, and different intervals (unequal intervals) are used as shown in the right of FIG. 1.

That is, in a case of a vane-type oil pump, as shown in the left of FIG. 1, when the intervals of vanes are equal, speeds of the vanes passing a discharge port part are the same during one revolution of a rotor of a motor, and thus a pure tone of a specific constituent is repeated and noise is generated.

However, when the intervals of vanes are unequal, speeds of the vanes passing the discharge port part are different during one revolution of the rotor of the motor, and thus pure tones generated by respective vanes are dispersed into several constituents, whereby noise level may be reduced.

In the meantime, in an oil pump to which the unequal interval vanes are applied, an unequal interval difference (maximum angle−minimum angle) of the vane is required to be appropriately designed for the following reasons.

If the interval difference between the vanes is large, an oil pocket between the vanes is not full of oil, and thus charging efficiency decreases. This results in reduction of delivery flow rate of the oil, and in aeration due to the space in which the oil is not filled.

Also, if the interval difference between the vanes is small, the amount of oil to be filled in the oil pocket between the vanes is reduced, and thus charging efficiency decreases.

Moreover, the maximum angle between unequal intervals of the vanes is restricted by the width of a sealing surface.

Specifically, inside the oil pump, there are a low-pressure part and a high-pressure part which are separated by a sealing surface. The sealing surfaces are positioned respectively where the maximum oil pocket and the minimum oil pockets are generated on an eccentric shaft of the rotor.

Here, the interval between the vanes may not be set to be greater than the width of the sealing surface, because when the width between the vanes is greater than the sealing surface, the high-pressure part and the low-pressure part are connected to each other so that pressure distribution is equal and oil stored in an oil pan may not be drawn by the low-pressure portion.

Also, the oil pump with the unequal interval function may apply only in an oil pump consisting in vanes.

That is, in a gear-type oil pump, etc. Including an interval gear and an external gear, an oil pocket is generated by gears meshing with each other, and thus an unequal interval cog form where intervals between gear cogs are different is not applicable.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling an electric oil pump driven by a motor, the method realizing an effect of unequal interval vanes in a gear-type rotor or an equal interval vane type rotor by controlling a current of the motor, whereby noise generated from the oil pump may be reduced.

In various aspects of the present invention, there is provided a method of controlling an electric oil pump driven by a motor, the method including: changing, by a controller, a frequency of a current applied to the motor with a predetermined control cycle to control RPM of the motor to instantaneously change into a different value according to a frequency change.

The frequency of the current may be determined by RPM of the motor and the number of vanes of a rotor of the oil pump During one revolution of the rotor of the oil pump, the frequency of the current applied at regular control cycles to the motor may be changed irregularly.

A level of the frequency of the current may be changed irregularly.

A direction the frequency of the current may be changed irregularly.

The number of times that the frequency of the current is changed may be equal to or less than the number of vanes forming the rotor of the oil pump.

The range of change in the current applied to the motor may be set for the vanes which form the rotor of the oil pump to have unequal interval widths.

According to an exemplary embodiment of the present invention, during one revolution of the motor, the level and direction of the current being applied is changed irregularly such that the RPM of the rotor is changed with the level and direction of the current. The speed at which each vane passes the discharge port portion varies such that a pure tone generated by each vane may be dispersed into several constituents, whereby the level of the noise may be reduced.

Also, the present invention may apply to vane-type pumps as well as other-type rotors, such as a cooling fan, to reduce noise, and also to a fixed gear type oil pump to which unequal intervals is not applicable.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
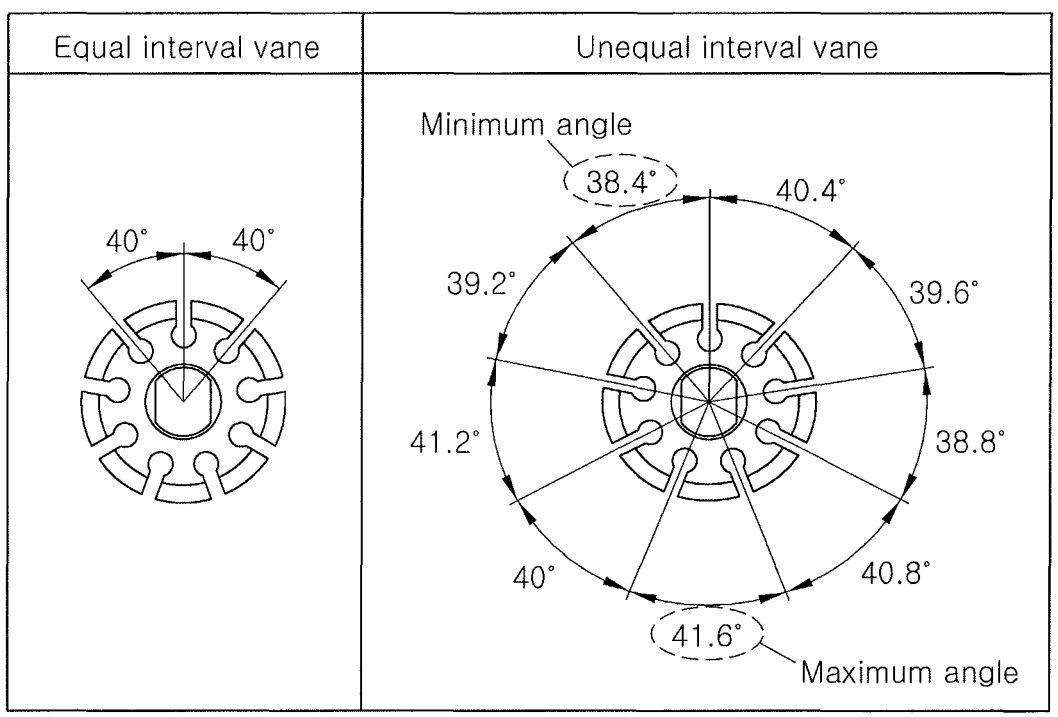
FIG. 1 is a view illustrating comparison of an equal interval vane and an unequal interval vane structures.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinbelow, various exemplary embodiments of the present invention will be described in detail with reference to the accompanying drawings.

Figure 3:
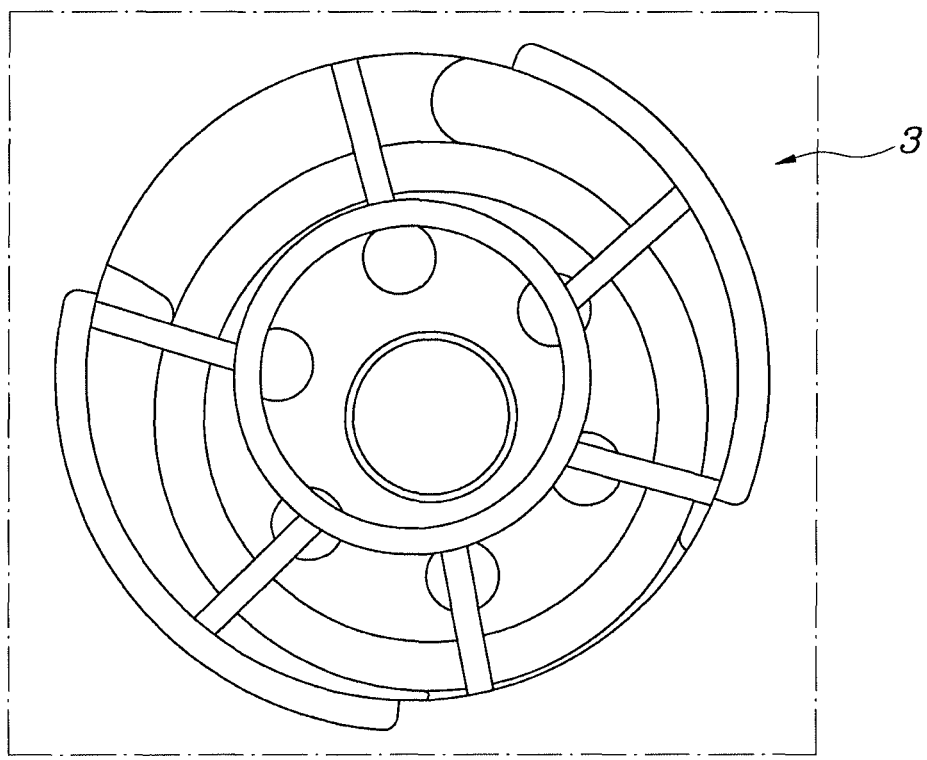
FIG. 3 is a view illustrating an example of a vane-type oil pump applicable to the present invention.
Figure 4:
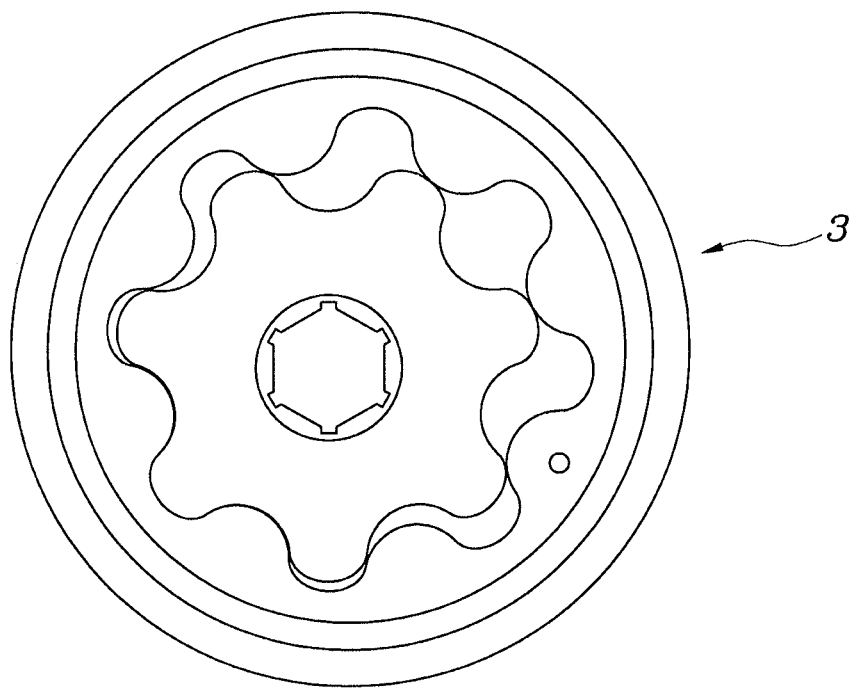
FIG. 4 is a view illustrating an example of a gear-type oil pump applicable to the present invention.

Various embodiments of the present invention relate to a method of controlling an electric oil pump. The electric oil pump may be an engine oil pump with equal interval vanes as shown in FIG. 3, or may be a gear-type oil pump as shown in FIG. 4.

For example, when a target oil pressure is determined according to an engine operation condition, the electric oil pump 3 is operated to generate an oil pressure corresponding to the target oil pressure, and the generated oil is provided to a requiring portion.

Figure 2:
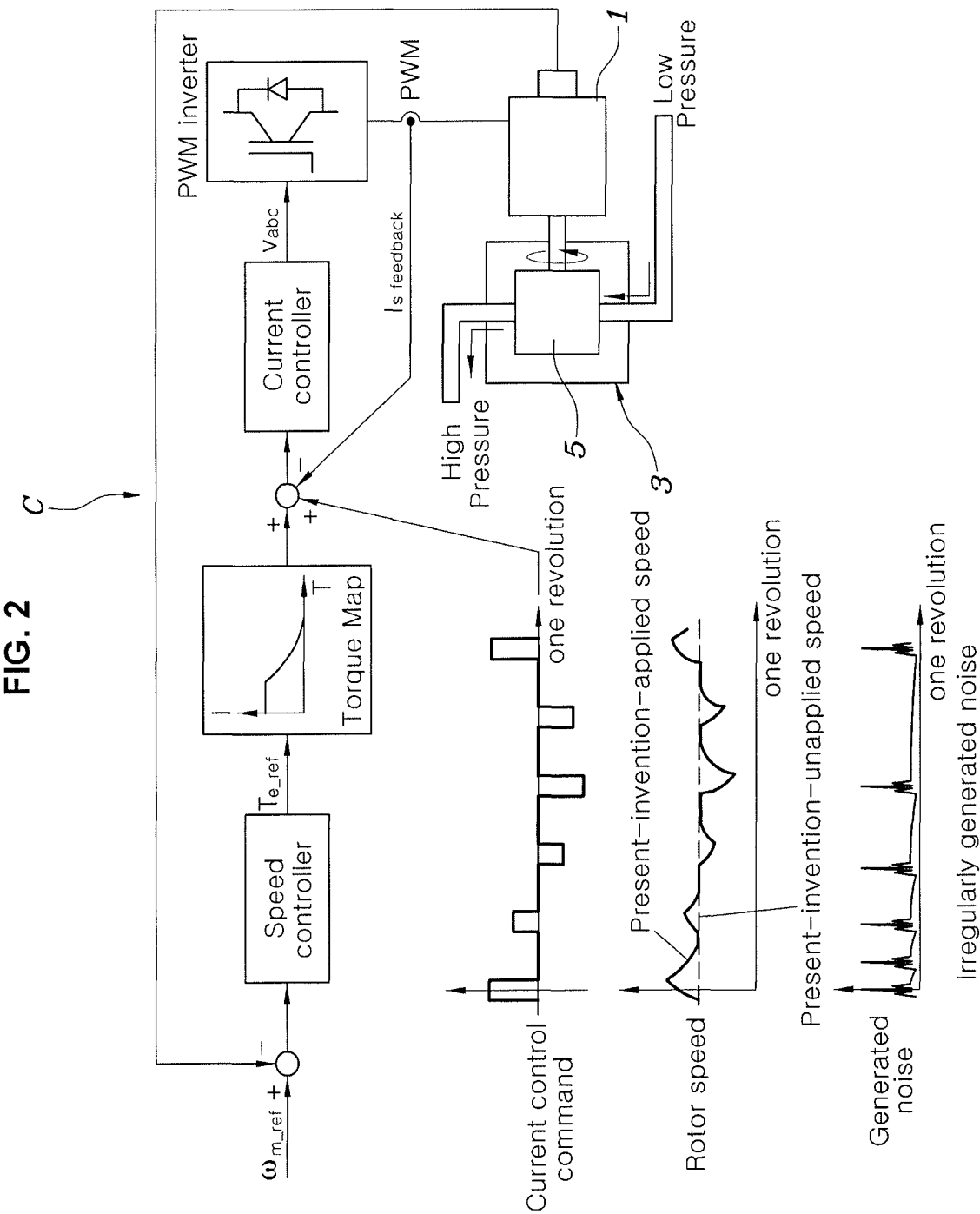
FIG. 2 is a view illustrating a control circuit of an electric oil pump according to an exemplary embodiment of the present invention.

In the meantime, according to the method of controlling the electric oil pump in an exemplary embodiment of the present invention, as shown in FIG. 2, the frequency of the current applied to a motor 1 to operate the oil pump 3 is changed with a predetermined control cycle by a controller C to control RPM of the motor 1 to instantaneously change into a different value according to the change in the frequency.

The frequency of the current may be determined by RPM of the motor 1 and the number of vanes of a rotor of the oil pump. During one revolution of the rotor 5 of the oil pump 3, the current applied at regular control cycles to the motor 1 may be changed irregularly. Here, the rotor 5 of the oil pump 3 may include equal interval vanes.

For example, the level of the frequency of the current applied to the motor 1 is changed irregularly such that RPM of the motor 1 is changed irregularly.

Also, the direction of the frequency of the current applied to the motor 1 is changed irregularly such that RPM of the motor 1 is changed irregularly.

Here, the number of times that the frequency of the current of the motor 1 is changed may be set not to exceed the number of vanes that form the rotor 5 in the oil pump 3.

That is, through variation in the range of change in the current applied to the motor 1, the vanes which form the rotor 5 of the oil pump 3 may set to have unequal interval widths.

Hereinafter, the principle of applying the current of the motor 1 irregularly to realize an effect of the unequal interval vanes will be described in detail.

A frequency of an AC motor current applied to a rotating magnetic field of the motor to operate the AC motor at a specific RPM is described in the following Equation (1).

$$f = (A \text{ rpm}/60) * (P/2) \quad \text{Equation (1)}$$

(f: frequency of current, A: motor RPM, P: the number of poles of the motor)

When the frequency in Equation (1) is changed by ±10% and ±20%, the RPM of the motor changes as A±10% and A±20%, respectively.

That is, the frequency of the rotating magnetic field applied to the motor in Equation (1) is changed instantly such that the RPM of the motor is changed instantly. This may realize the function as if the vanes passing a discharge port part are different in speed due to unequal intervals between the vanes. By realizing the function, the range of change in the frequency applied to the rotating magnetic field of the motor may correspond to the unequal interval width of each vane.

Furthermore, each vane RPM may be configured differently depending on how many times the motor speed changes per revolution.

Here, the number of times that the speed changes per revolution of the motor corresponds to the number of unequal interval vanes, which may set to control cycles of the motor RPM.

For example, when assuming that the number of vanes that form the rotor of the oil pump is N, the speed Sp at which one equal interval vane passes (frequency) may be obtained by the following Equation (2).

$$Sp(\text{Hz}) = (A \text{ rpm}/60) * N \quad \text{Equation (2)}$$

That is, when the pump having 10 vanes (N=10) rotates at 6000 rpm, the speed at which each vane passes the discharge port part is 1 msec and the frequency is 1000 Hz.

According to the present principle, when six speed changes occur at a control cycle of 1000 Hz during one revolution of the motor, it may be set as if unequal interval vanes are configured at six type intervals.

However, the number of vanes is a constant value related to the flow rate and the size of the oil pump, and the number of times that the speed changes does not exceed the number of the vanes. Also, even though the speeds at which the vanes pass the discharge port part are different from each other due to control of the motor current, an average speed per revolution of the oil pump is set to be equal to a predetermined speed and a predetermined flow rate is output.

Thus, using the range of change in the motor RPM in Equation (2), it may be configured to exceed a limit value for the maximum vane width in conventional unequal interval vanes.

A control process of the electric oil pump according to an exemplary embodiment of the present invention will be described with reference to FIG. 2.

When a target oil pressure required to drive an engine is determined, a target motor speed for generating the target oil pressure is determined.

Next, when the target motor speed is input to a speed controller, a target motor torque corresponding to the target motor speed is determined and a target motor current is determined using a torque map providing a relation between the target motor torque and the target motor current.

The determined target motor current and a current control command where the level and direction of the current is changed irregularly are superimposed and input to a current controller. The current controller converts the superimposed target motor current into a voltage signal, and provides the voltage signal to a pulse width modulation (PWM) inverter.

The PWM inverter converts the voltage signal to a PWM signal and provides the signal to the motor such that the motor is operated.

As described above, according to an exemplary embodiment of the present invention, the level and direction of the current applied to the motor 1 are changed irregularly by the current control command such that the RPM of the rotor 5 rotating according to operation of the motor 1 also varies with the level and direction of the current.

Accordingly, like the rotor 5 with the unequal interval vanes, the speed at which each vane passes the discharge port part varies, such that the pure tone generated by each vane may be dispersed into several constituents, whereby the level of the noise may be reduced.

According to the present principle, the present invention may apply to vane-type pumps as well as other-type rotors, such as a cooling fan, to reduce noise, and also to a fixed gear type oil pump to which unequal intervals is not applicable.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an electric oil pump driven by a motor, the method comprising: changing, by a controller, a frequency of a current applied to the motor with a predetermined control cycle to control revolution per minute (RPM) of the motor to change into a different value according to a frequency change, wherein the controller includes a current controller, wherein a target motor current determined by using a torque map providing a relation between a target motor torque and the target motor current, and a current control command in which a level and a direction of the current applied to the motor is changed irregularly, are superimposed and input to the current controller, wherein the current controller converts the superimposed target motor current into a voltage signal, and provides the voltage signal to a pulse width modulation (PWM) inverter, and wherein the PWM inverter converts the voltage signal to a PWM signal and provides the PWM signal to the motor.

2. The method of claim 1, wherein the frequency of the current is determined by the RPM of the motor and a number of vanes of a rotor of the electric oil pump.

3. The method of claim 2, wherein a number of times that the frequency of the current is changed is equal to or less than the number of vanes forming the rotor of the electric oil pump.

4. The method of claim 1, wherein the controller includes a speed controller, and wherein when a target motor speed for generating a target oil pressure required to drive an engine is input to the speed controller, the speed controller determines the target motor torque corresponding to the target motor speed.

* * * * *